United States Patent [19]

Walmsley

[11] Patent Number: 5,656,678
[45] Date of Patent: Aug. 12, 1997

[54] METHOD AND APPARATUS FOR THE PRODUCTION OF POLYURETHANE FOAM USING VARIABLE CAPACITY TROUGH

[75] Inventor: Graham D. Walmsley, Hickory, N.C.

[73] Assignee: Hickory Springs Manufacturing Company, Hickory, N.C.

[21] Appl. No.: 645,582

[22] Filed: May 14, 1996

[51] Int. Cl.$^6$ ................................................ C08G 18/00
[52] U.S. Cl. ................................. 521/155; 521/917
[58] Field of Search ................................. 521/155, 917

[56] References Cited

U.S. PATENT DOCUMENTS

| | | |
|---|---|---|
| 1,922,459 | 8/1933 | Schmidt et al. . |
| 3,190,927 | 6/1965 | Patton, Jr. et al. . |
| 3,215,652 | 11/1965 | Kaplan . |
| 3,346,557 | 10/1967 | Patton, Jr. et al. . |
| 3,585,185 | 6/1971 | Levis, Jr. et al. . |
| 3,629,308 | 12/1971 | Bailey et al. . |
| 3,639,541 | 2/1972 | Austin et al. . |
| 3,639,542 | 2/1972 | Pizzini et al. . |
| 3,812,227 | 5/1974 | Blackwell et al. . |
| 3,832,099 | 8/1974 | Berg . |
| 3,931,092 | 1/1976 | Ramlow et al. . |
| 3,965,228 | 6/1976 | Vreenegoor . |
| 3,998,575 | 12/1976 | Vreenegoor . |
| 4,014,846 | 3/1977 | Ramlow et al. . |
| 4,032,275 | 6/1977 | Schwab et al. . |
| 4,074,960 | 2/1978 | Dockray et al. . |
| 4,093,109 | 6/1978 | Schrader . |
| 4,093,573 | 6/1978 | Ramlow et al. . |
| 4,122,056 | 10/1978 | Ramlow et al. . |
| 4,246,356 | 1/1981 | Walmsley . |
| 4,374,209 | 2/1983 | Rowlands . |
| 4,530,807 | 7/1985 | Vreenegoor . |
| 4,559,003 | 12/1985 | Poncet . |
| 5,120,771 | 6/1992 | Walmsley . |
| 5,342,859 | 8/1994 | Blanpied et al. . |
| 5,375,988 | 12/1994 | Klahre . |
| 5,506,278 | 4/1996 | Wamsley . |

FOREIGN PATENT DOCUMENTS

| | | |
|---|---|---|
| 1482213 | 8/1977 | United Kingdom . |
| 1501172 | 2/1978 | United Kingdom . |

*Primary Examiner*—Morton Foelak
*Attorney, Agent, or Firm*—Fisher, Christen & Sabol

[57] ABSTRACT

A polyurethane foam is produced by mixing foam forming chemicals with the mixing being effected to produce an unfoamed liquid mixture and then feeding the unfoamed liquid mixture into an open-topped trough in which the liquid mixture remains for a dwell time during which an exothermic and gas-forming reaction occurs and the liquid begins to foam and for a partially foamed froth. The volume of the open-topped trough and the dwell time of the foam forming chemicals in the trough are adjusted by tilting the trough. The partially foamed froth is discharged across a curved lip portion at the top of the open-topped trough on to a surface on which the foamed froth is allowed to further react and form a solid polyurethane foam material. The curved lip portion is shaped to minimize shear forces and stresses in the foam and ensure smooth overflow of the foamed froth at different tilt angles. Continuous foam production is achieved without the need for process shutdowns for foam formulations requiring different dwell times.

11 Claims, 4 Drawing Sheets

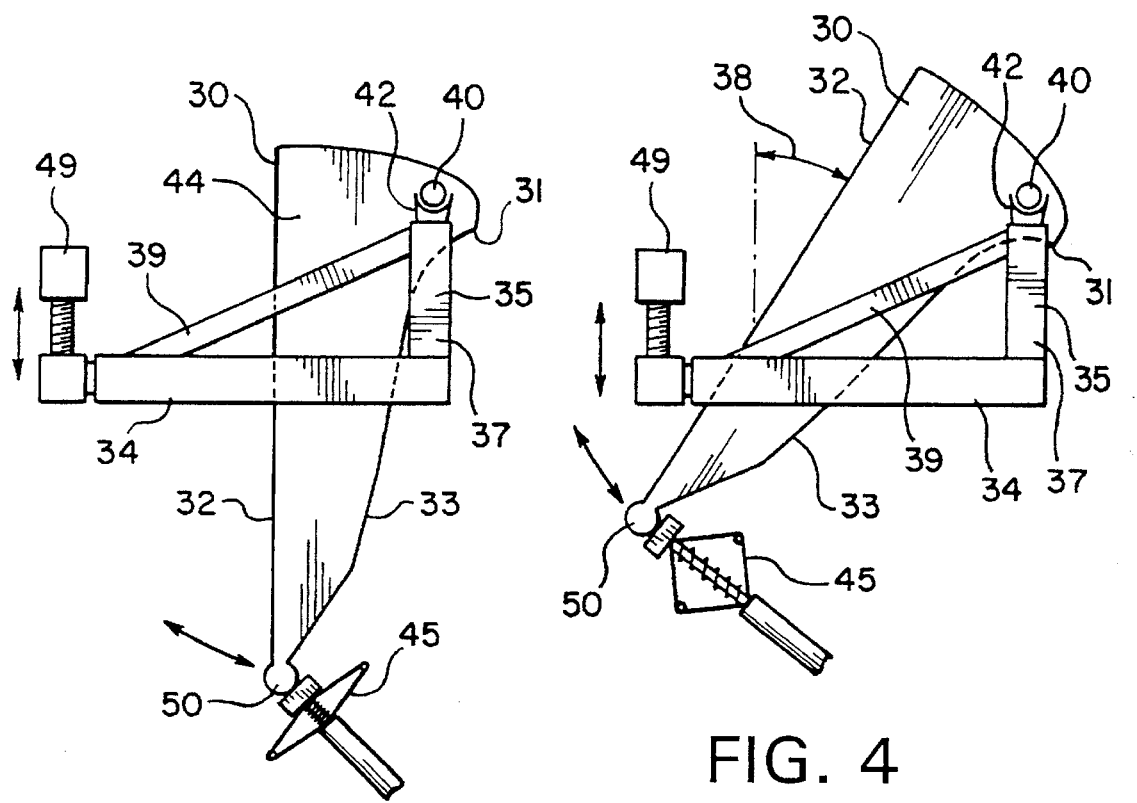
FIG. 3
FIG. 4
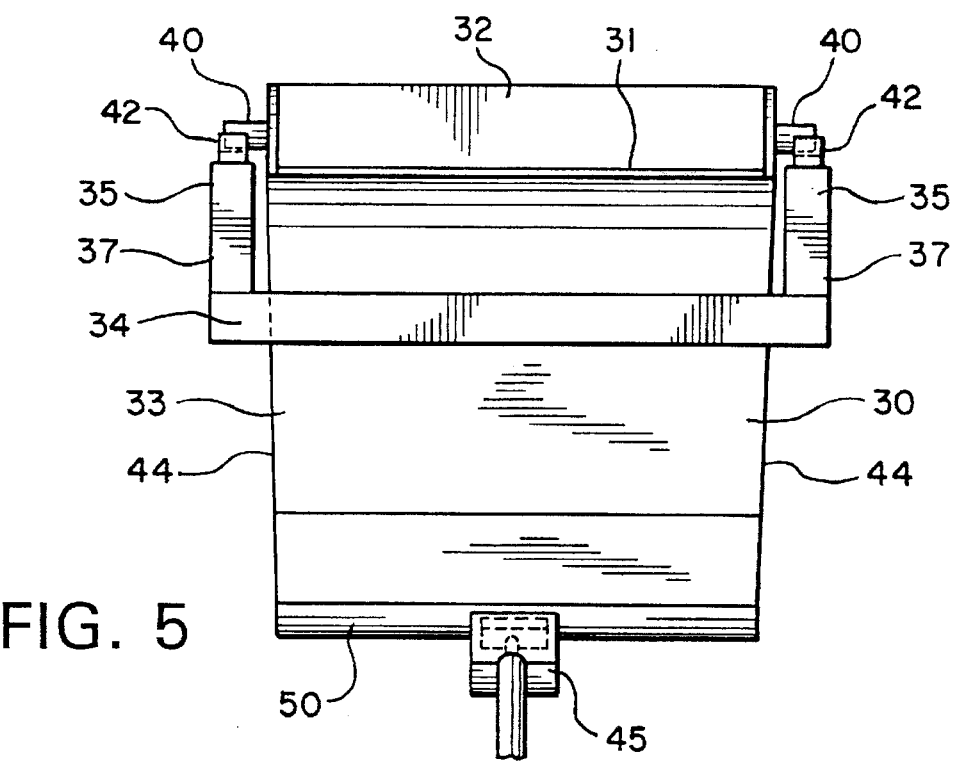
FIG. 5

METHOD AND APPARATUS FOR THE PRODUCTION OF POLYURETHANE FOAM USING VARIABLE CAPACITY TROUGH

FIELD OF THE INVENTION

This invention relates to a method and apparatus for the manufacture of flexible polyurethane foam.

BACKGROUND OF THE INVENTION

The usual procedure for manufacture of flexible polyurethane foam in block form involves metering several liquid chemicals in steady, continuous streams to a mixing head where they are intimately mixed together and deposited onto a film-covered conveyor which moves the chemicals forward. The chemical reactions produce polyurethane polymer and carbon dioxide gas which form, continuously, a block of polyurethane foam having a density which is usually in the range of 0.75 to 4.5 lbs/cu. ft. The reaction is exothermic. Chemicals exiting the mixing head at 68° F. can reach a temperature of 330° F., and sometimes more than 350° F., at the time the block is fully formed, depending on the formulation used.

Conventionally, the essential chemicals used to make a polyurethane foam are polyol, toluene diisocyanate (TDI), water, a silicone surfactant, an amine catalyst, and stannous octoate catalyst. Other chemicals such as auxiliary blowing agents, flame retardants and inorganic or organic fillers may be incorporated optionally to meet specific requirements, but are not essential to the basic process.

The TDI reacts with the polyol to form polyurethane. The TDI also reacts with the water to form carbon dioxide gas, which serves as a blowing or foaming agent. The amine catalyst promotes the reaction between the TDI and water which forms carbon dioxide gas. The stannous octoate catalyst promotes the reaction between the TDI and the polyol to form the polyurethane polymer. The silicone surfactant serves to support the homogenization of the chemicals and to regulate the cell structure of the flexible polyurethane foam.

One method of manufacturing polyurethane foam block is where the mixed chemicals are deposited directly from the mixing head onto the fill covered conveyor. In this case the chemicals spread out, essentially unreacted, as a thin film. Reaction takes place as the chemicals are moved forward on the conveyor. The heat of the reaction is slow to develop and has to be accelerated by using moderate to high catalyst levels. This process, wherein the chemicals exiting the mixing head are immediately deposited onto the film covered conveyor as essentially unreacted chemicals, was prevalent until the late 1960's.

A well known and widely used improvement of this conventional procedure employs the Maxfoam®/Varimax system. The Maxfoam® system was introduced in the late 1960's. With this system, the essentially unreacted chemicals from the mixing head are directed into the bottom of an open top trough, generally of 60-120 liters capacity. The chemicals start to react in the trough resulting in a froth which overflows the trough onto film-covered fall plates leading downwardly to a conveyor where further expansion and polymerization occurs. This system is the preferred method for producing flexible, polyether-type polyurethane foam, enabling higher blocks of foam to be produced at lower chemical throughputs and slower conveyor speeds. The Maxfoam®/Varimax process simplifies operation and has important economic advantages.

One of the advantages of using a system employing a trough is that chemicals that enter a trough retain the heat of reaction much better, via a mass effect, and lower catalyst levels can be used compared to the conventional methods of depositing the chemicals directly onto the film covered conveyor. It can be appreciated that by varying the volume/capacity of the trough, that the deployment time or residence time in the trough can be varied. As an example, if the volume of the trough is doubled from 60 liters to 120 liters capacity, the froth exiting the trough will be thicker and at a more advanced stage in the overall blowing/polymerization process(es). As such, the trough can be considered to be a "mechanical" catalyst. For a given chemical throughput and catalyst levels, the degree of gas evolution and polymerization when the chemicals exit the trough (known as "spillover") will vary, dependent upon the volume of that trough and consequent chemical "dwell time" or residence time in that trough.

Present day polyurethane foam manufacturing plants can produce well in excess of fifty different grades of foam, from high to low densities and firm to soft grades. Reactivities of the chemicals used to manufacture different grades of foam vary widely and to accommodate this, different types and levels of catalysts and a range of trough sizes (volume/capacity) are used to optimize process conditions. It is desirable to avoid shutting down foam manufacture when changing grades, and wherever possible manufacturing runs of different grades which can be made with the same trough size are grouped together.

However, when changing to a grade which requires a different trough size, it may become necessary to stop the foam pouting operation, remove the trough, install a different size trough and then restart the operation, which is inconvenient and expensive.

U.S. Pat. No. 3,832,099 to Berg discloses a trough for forming polyurethane foams wherein partially expanded foam passes over a weir. To use a foam formation having a high rate of foam rise, the trough may be elevated vertically by a ram in order to cooperate with plates which are also vertically adjustable.

U.S. Pat. No. 4,032,275 to Schwab, et al. and U.S. Pat. No. 4,074,960 to Dockray, et at. also disclose troughs for forming polyurethane foam with height adjustment of the trough and conveyor. The volume of the trough may be varied by expansion of the trough in the direction transverse to conveyor movement to accommodate the production of varying widths of foam.

U.S. Pat. No. 4,093,109 to Schrader discloses a trough for forming polyurethane foams which has a curved lip portion. The trough also can be varied in volume by expansion of the trough in the direction transverse to conveyor movement.

Changing the height of a trough so as to accommodate various volumes of foaming ingredients creates problems in transfer of the foaming ingredients to a continuous belt conveyor. For example, changing the distance between the point of overflow and the belt conveyor may result in bubbling, or a rough or uneven top or bottom portion on the foam. The altered distance may require a change in the height or angle of the belt conveyor or a change in the angle of fall plates, an inclined conveyor, or a ramp between the trough and the belt. This angle change may result in an undesirable change in the shape or height of the foamed product.

Tilting of the trough may be used to adjust the distance between its overflow point and the belt conveyor. However, a conventional trough lip has an extended flat surface bent at an angle to the front wall of the trough to provide a downwardly directed flow surface. Tilting a trough with a conventional flat lip into different angular positions tends to create high shear forces and stresses upon the foaming ingredients. It may cause snagging of the foaming mixture and result in a non-uniform product, and excessive surface roughness or unevenness.

U.S. Pat. No. 4,530,807 to Vreenegoor discloses a trough for forming polyurethane foams which can be emptied by tilting at the end of a production run. Tilting to adjust trough volume for producing foam is not disclosed.

U.S. Pat. No. 4,559,003 to Poncet discloses a zone of retention for foam ingredients which may be formed above the nip of a rear cylinder and a front cylinder. In another embodiment, the zone may be formed by a rear wall which in part follows the coutour of a front cylinder. The volume of the zone can be adjusted continuously during polyurethane foam production by pivoting the rear cylinder or the rear wall about the axis of the front cylinder. It is disclosed that an advantage of the variable volume is to avoid the necessity of adjusting catalysis. The primary phase of expansion of the mixed chemicals and their further expansion are produced outside of the zone of retention on the horizontal surface of a plate and conveyor. However, a sheet continuously passes through the zone, and the front cylinder continuously rotates thereby requiring tight tolerances and subjecting the assembly to leakage and continual wear.

In the present invention, improved foam pouring flexibility is obtained by providing a variable volume trough wherein the volume/chemical retention time of the trough can be varied without requiring interruption of foam pouring for trough replacement. The foaming ingredients may be transferred from the trough to a substantially horizontal continuous conveyer belt at varied volume/retention times or residence times without requiring re-angling of any conveyer belts or re-angling of fall plates or ramps. The same or substantially the same inclination may be used for a plurality of dwell times without: a) creating undesirable bubbles, b) undercutting, c) adversely affecting foam surface uniformity and smoothness, and d) adversely affecting foam cell structure uniformity. The volume of the trough may be varied in accordance with the present invention to vary dwell lime by providing the trough with at least one moveable wall or by tilting the trough without the need for a sheet which continuously passes through the trough. In embodiments of the invention, the volume of the trough may be varied without changing the width of the apparatus and sheet of foam it produces. The trough of the present invention may be tilted to vary dwell time while permitting easy, snag-free positioning of the lip relative to a connecting fall plate or conveyor in different angular dispositions. The trough lip of the present invention achieves smooth overflow in different angular dispositions of the trough, and minimizes shear forces and stresses arising with extended lip structures.

SUMMARY OF THE INVENTION

The present invention provides a method for varying the dwell time of foam forming ingredients in a trough for the preparation of different foams without requiring interruption of foam manufacturing operations for replacement of the trough with one of a different size. Improved foam pouring flexibility is obtained by providing a variable volume trough. The utilizable trough volume (i.e., the volume up to its overflow outlet) can be varied without need to stop the foaming operation and remove and replace the trough.

According to one aspect of the present invention, there is provided a foam manufacturing process wherein foam-forming ingredients are fed to a trough to commence reaction therein and overflow an open top thereof, wherein the trough has at least one positionally adjustable wall thereto by means of which the volume of ingredients in the trough before it overflows is adjusted. Most preferably, the adjustability of dwell time is attained by tilting of the trough to change the disposition thereof and consequently to change its utilizable volume or capacity.

The present invention also provides apparatus for use in the manufacture of foam comprising a mixing head for mixing foam forming ingredients, a trough with an open top outlet thereto, said trough being arranged to receive the mixed ingredients from the said mixing head, and a conveyor system arranged beneath the open top outlet of the trough to receive overflowed mixed ingredients therefrom, wherein the trough has at least one positionally adjustable wall thereto operable to adjust the volume of the trough up to the said outlet thereof.

The present invention also provides a trough assembly for use in foam manufacture having an upright mounted container with an open top and an overflow outlet defined at one side of the open top. A tilting mechanism including adjustment means is operable to tilt the trough to a selected inclination relative to a horizontal plane through the overflow outlet.

The tilting mechanism may comprise a pivotal mounting having a substantially horizontal axis in the upper region of the trough preferably at or adjacent to the overflow outlet. The adjustment means may comprise a screw, a hydraulic piston or electrically actuated scissor-jack or any other suitable device operable to apply an upwards and rearwards force to a lower region of the trough to cause it to pivot about the horizontal axis. Alternately, similar means such as a winch or any other suitable device may be provided to provide a pulling force, rather than a pushing force, in order to tilt the trough by pivoting it about the horizontal axis.

The trough is preferably constructed with a straight rear wall and an inclined front wall leading to the overflow outlet whereby the trough is tapered downwardly in cross-section. In preferred embodiments, the front wall has a forwardly directed lip to facilitate overflow of material. With the trough of the present invention, a foreshortened lip is preferred, rather than a lip having an extended flat surface bent at approximately a right angle to the front wall of the trough. The foreshortened lip is preferably curved or similarly shaped to ensure smooth overflow in different angular dispositions of the trough. The curved lip is curved convex upwardly from the inner surface of the front wall so as to permit easy, snag-free positioning of the lip relative to a connecting fall plate or conveyor in different angular dispositions. The curved lip also minimizes shear force-s and stresses arising with extended lip structures.

The curved lip may be integral with the front wall or fastened to it with conventional fasteners or by welding. The outwardly projecting lip is provided at the overflow outlet defined at one side of the open top of the trough. The lip is curved outwardly from the interior surface of the wall. In preferred embodiments, the lip is at least substantially flush or contiguous with the inside wall surface to provide a smooth surface over which the foaming ingredients pass as they exit the trough.

In preferred embodiments, the curved lip is disposed in relation to a fall plate or conveyor such that a predetermined gap and inclination is maintained therebetween in different tilted positions or inclinations of the trough. This may be achieved by virtue of the curvature of the lip and/or by means of an adjusting device which is operable to adjust the position of the trough in order to compensate for bodily positioned movement of the lip during tilting of the trough.

In a particularly preferred embodiment, the tilting mechanism includes adjustment means operable to tilt the trough to a selected inclination related to a horizontal plane through said overflow outlet, and the adjusting device is operable to adjust the position of the trough vertically. The adjusting device may comprise an electrically actuated jack or any other suitable device.

BRIEF DESCRIPTION OF THE DRAWINGS

FIG. 3 is a sectional view of an embodiment of the trough and tilting apparatus in accordance with the present invention with the trough in the vertical, untilted position;

FIG. 4 is a sectional view of an embodiment of the trough and tilting apparatus in accordance with the present invention showing the trough in the tilted position;

FIG. 5 is a front elevational view of the trough and tilting apparatus with the trough in the vertical untilted position of FIG. 3.

DETAILED DESCRIPTION OF THE INVENTION

Figure 1:
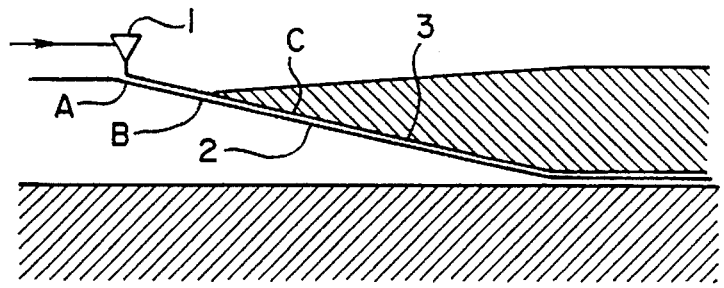
FIG. 1 is a schematic section through a mixing head and the adjacent end of a conveyor apparatus used for the production of polyurethane foam in a prior process which does not use the trough used in the process of the present invention.

In the conventional process for the production of a polyurethane foam shown in FIG. 1 and known as the "wet laydown" process, a polyol, an isocyanate, water, a silicone surfactant and a catalyst are separately metered to a mixing head 1. In practice, two types of catalyst are normally employed, an amine catalyst to control the rate of the isocyanate-water reaction which generates carbon dioxide, and an organotin catalyst which controls the rate of the isocyanate-polyol reaction. The mixing head continuously mixes the starting materials, and the dwell time of the materials in the mixing head rarely exceeds 0.5 seconds.

The resultant mixture leaves the mixing head 1 as a liquid and is deposited directly at point A upon a downwardly sloping conveyor 2; this conveyor 2 carries a plastic film 3, which is discarded after a single pass along the conveyor 2, the plastic film serving to prevent the conveyor 2 becoming contaminated with foam residue and also serving to provide a smooth lower surface on the foam produced. The conveyor 2 typically slopes downwardly at an angle of 3.5°–6° to the horizontal to drain the mixture forwardly away from the mixing head 1. At point A, the mixture is completely fluid and drains easily. A short distance along the conveyor, at point B (the so-called "cream line"), the foam-forming reactions begin to affect the mixture, its viscosity begins to increase, and gas bubbles form. Care must be taken that the fluid mixture from the mixing head does not "undercut" at point C i.e., the liquid mixture from the mixing head must not run between the foam which is beginning to form and the conveyor 2, or an unsatisfactory foam product will result.

The distance between points A and B is affected by conveyor speed, angle of slope of the conveyor and catalyst concentrations, together with other factors affecting the rate of the foam forming reaction including the specific polyol and isocyanate employed, etc. The slower the start of the reaction, the greater the distance between points A and B, and as this distance is progressively increased, there comes a point at which undercutting at point B and the production of an unsatisfactory foam become inevitable. Although this distance can be decreased by increasing the catalyst concentration in the mixture, there are limits to the amounts of catalyst which can be employed, since excessive amounts of catalyst (and hence very high reaction rates) may produce collapse of foam, splits in the foam or a pneumatic (closed cell) foam, and any of these defects may render the foam unsalable. Hence, the scope for decreasing the distance between points A and B by increasing catalyst concentration in the mixture is limited. This process, wherein the foam forming chemicals exiting the mixing head are immediately deposited onto the film-covered conveyor as essentially unreacted chemicals, has been improved upon by the use of an open-topped trough between the mixing head and the fall plates and/or conveyor wherein the foaming reaction commences in the trough, prior to the chemicals being deposited on the conveyor.

In the trough process the reactants are not, immediately after their admixture, spread over the surface on which the foam is to be formed. Instead, the reactants are retained in a bulk form for a dwell time during which an exothermic and gas-forming reaction occurs and the liquid begins to foam. The retention of the reactant mixture in bulk form prior to spreading this mixture is preferably achieved by feeding the mixture into an open-topped reaction vessel in which the reactant mixture remains for the dwell time. Processes using such an open-topped reaction vessel (referred to hereinafter as "trough processes") are known in the polyurethane art and are described, inter alia, in U.S. Pat. No. 4,246,356, issued Jan. 20, 1981 to the present inventor.

Figure 2A:
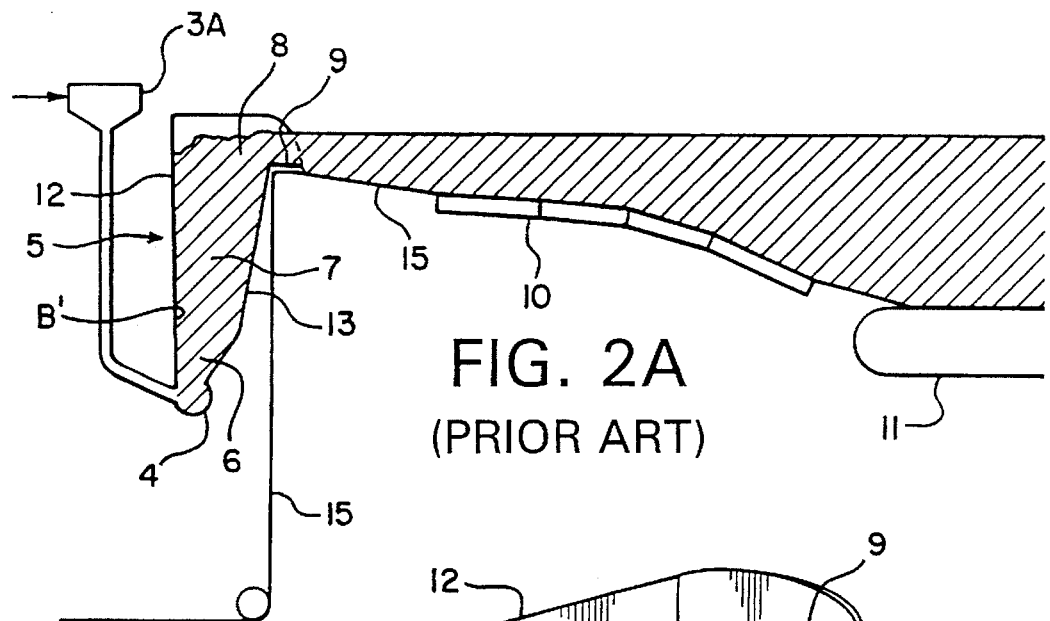
FIG. 2A is a schematic section through a mixing head, trough, fall plate and the adjacent end of a conveyor apparatus used for the production of polyurethane foam in a prior process which does not use the trough used in the process of the present invention.
Figure 2:
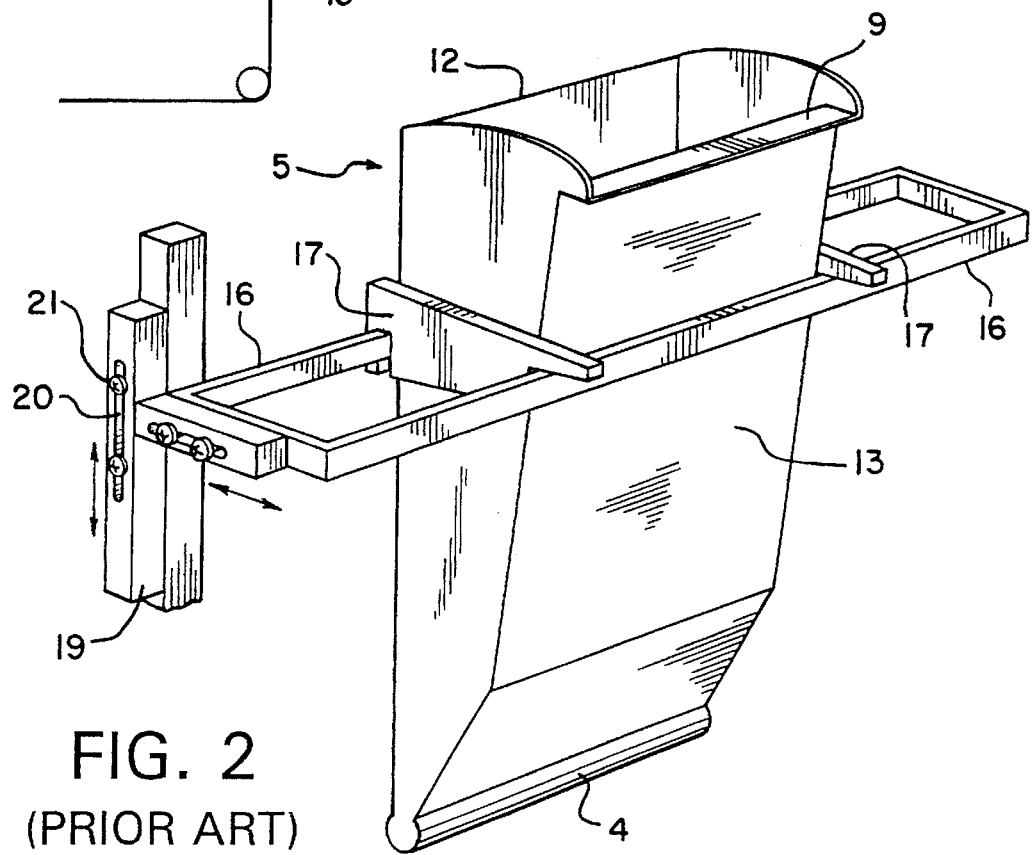
FIG. 2 is a perspective view of a trough used for the production of polyurethane foam in a prior process.

As illustrated in FIGS. 2 and 2A of the accompanying drawings, in the trough process all the reactants are fed to a mixing head 3A, which can be identical to the mixing head 1 shown in FIG. 1. However, instead of flowing out of the mixing head 3A directly on to a conveyor, in a trough process the mixture of reactants leaving the mixing head 3A is passed into a chemical inlet robe 4 in the bottom of open-topped trough 5. The volume of this trough is made sufficiently large relative to the throughput of reactants that the reactants in the trough form three zones, designated 6, 7 and 8 in FIG. 2A. The lowest zone 6 contains wet chemicals, while the central zone 7 contains creamed chemicals. Thus, the boundary between zones 6 and 7, designated B' corresponds to the cream line B in FIG. 1. The upper zone 8 contains frothing chemicals. From the upper end of zone 8, the frothing chemicals are allowed to overflow and spill over the lip 9, down the fall plate 10 onto the conveyor 11. The overflow of the frothing chemicals from zone 8 corresponds to a deposition of the same chemicals at approximately point C in FIG. 1. Thus, the trough process eliminates the undercutting which may otherwise occur at point B.

As shown in FIGS. 2 and 2A, a conventional upright, open-topped trough 5 has a vertical rear wall 12 and a forwardly inclined front wall 13. The front wall 13 terminates in a flat forwardly and downwardly directed lip 9 which is located very close to a film 15, comprised of, for example, paper or plastic and which travels down and covers adjustable multi-section fall plate 10 which is inclined downwardly to the end of a horizontal conveyor belt 11. The film 15 runs over the fall plate 10 and over the conveyor belt 11. Polyurethane foam is formed as a block moving along the conveyor.

As shown in FIG. 2, the open-topped trough 5 is held in trough support frame 16 on at least one trough location bracket 17 welded to the trough 5, in a fixed position. The fixed position is preset with trough location support pillars 19, only one of which are shown in FIG. 2, which are vertically adjustable, and hold the trough at a predetermined height with its rear wall 12 vertical. In this arrangement, with the rear wall 12 of the trough 5 fixed in the vertical plane, the location of the trough lip 9 in relation to the paper/plastic film 15 is controlled by the use of the adjustment slots 20 in support pillars 19. Fasteners 21 hold support pillars 19 in position after they have been adjusted to the proper position. In such a conventional apparatus, in order to change the volume of mixed ingredients in the trough 5 it is necessary to stop the foaming process and remove and replace the trough.

Typically, the trough 5 is 42" wide, width being defined as the dimension transverse to the direction of conveyor movement. Support frame 16 is usually 106" wide by 10" long.

Also, with the conventional trough 5, the lip 9 is relatively long and is flat to ensure smooth transition with the fall plates 10, and this gives rise to a substantial static region between the position where froth is being pushed out from the trough, and the position where froth is being pulled away on the fall plate. This gives rise to stresses in the produced foam.

Referring now to FIGS. 3, 4 and 5, the apparatus in accordance with the present invention constitutes a modification of the conventional apparatus with regard to the mounting of the variable volume trough 30 and the formation of its lip 31.

Making the trough a variable volume trough is achieved by pivoting the trough relative to the horizontal support frame 34 such that back plate or back wall 32 of the trough 30, shown in its vertical position in FIG. 3 and FIG. 5, can be angled as shown in FIG. 4, thus reducing the effective trough volume. Tilt angle 38 may range from about 5°, for minor volume adjustments, to about 60°, for larger volume adjustments. Tilt angle 38 may be measured from the back plate 32 to a vertical line. The tilt angle 38 can be varied in small increments, for example 1° or less, throughout its entire range of adjustment.

Thus, in its non-tilted position, tilt angle 38 is zero and the trough 30 has a vertical rear wall 32 and an inclined front wall 33 in a similar manner to the conventional trough. The trough 30 is mounted in a horizontal support frame 34, as shown in FIGS. 3, 4, and 5. In contrast to the conventional trough, the trough 30 is pivotly mounted relative to the horizontal support frame 34 and pivot bearing support frames 35. The pivot bearing support flames 35 may be located at or near the ends of the horizontal support 34. The support frames 35 may each comprise a substantially vertical front member 37 and an inclined member 39 which are fixedly attached to each other and to the top of the horizontal support 34.

A pivot shaft 40 or a pin or axle may be fixedly attached to each end 44 of the trough 30 for pivoting the shaft 40 within or on a pivot bearing 42. The pivot bearing 42 may be fixedly attached to or mounted on the pivot support frames 35 at or adjacent to the top of the vertical support member 37. The pivot shaft 40 pivots about its horizontal axis for adjustment of the tilt angle 38 of the trough 30.

The pivot shaft 40 may be mounted or attached to the side or end walls 44 of the trough 30 near or adjacent to the front wall 33 and lip 31. The pivot shaft 40 may be preferably located so that the trough pivots about a horizontal axis which is adjacent to or at the surface of the lip 31 over which the foaming ingredients flow. In embodiments of the invention, as shown in FIGS. 3, 4, and 5 the pivot shaft 40 may be located above the lip 31 so that the trough 30 pivots about a substantially horizontal axis which is above the lip 31.

Figure 6:
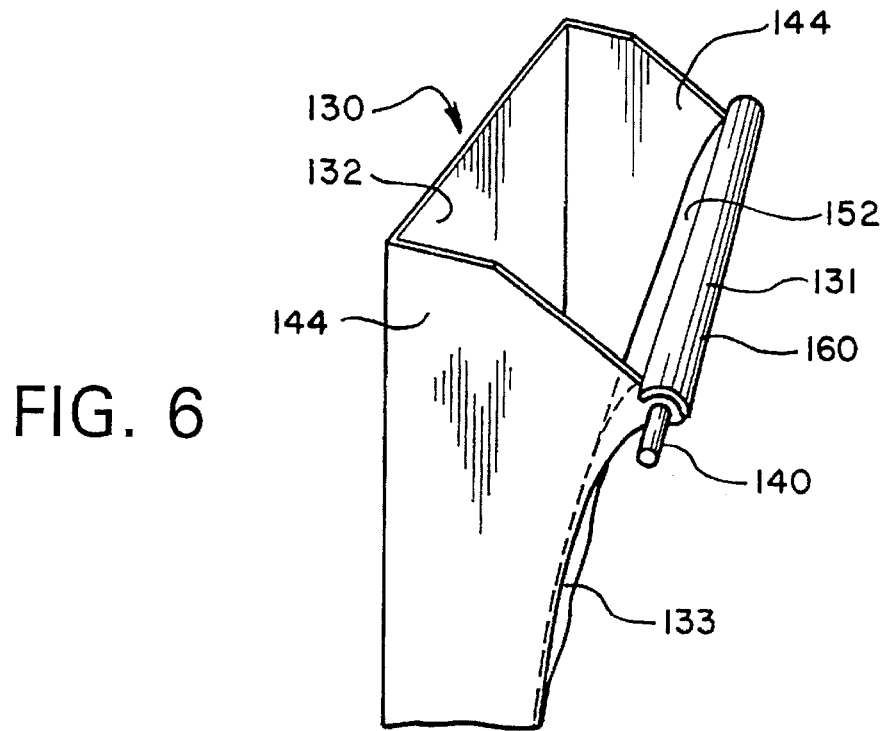
FIG. 6 is a partial perspective view of a tiltable, curved-lip trough in accordance with the, present invention.

In other embodiments of the invention, as shown in FIG. 6, the pivot shaft 140 may be located below the lip 131 so that the trough 130 pivots about a substantially horizontal axis which is below the lip 131. Also, as shown in FIG. 6, the back wall 132 may be longer or taller than the front wall 133 and terminate above the lip 131. The side or end walls 144 may slope downwardly along at least a portion of their width from the top of rear wall 132 towards the lip 131 as shown in FIG. 6.

In embodiments of the invention, the trough 30, 130 may have a pivot bearing (not shown) and the pivot support frame 35 may have a fixed pivot shaft or pin. In this embodiment, the bearing may be fixedly attached to the trough 30, 130 for pivoting about the pivot shaft which is fixedly attached to the pivot support frame 35.

Pivoting may be effected with at least one electrically actuated scissor jack 45 or a hydraulic ram or other equivalent means which bear on the bottom of the trough 30 and apply a force along an axis upwardly and rearwardly for tilting the trough forwardly and maintaining it at a desired tilt angle. As shown in FIGS. 3, 4, and 5, the point of contact of the applied force of jack 45 may be along chemical inlet tube 50. Other jack points along inclined front wall 33 may be used to apply the tilting force, depending upon the particular configuration. Alternately, a pulling force may be applied to back plate 32 to tilt trough 30 forwardly. For example, a lifting lug may be attached to back plate 32 and connected to an electric or mechanical winch, to apply a pulling force and tilt trough 30. FIGS. 3 and 5 show the trough 30 with the rear wall 32 vertical and FIG. 4 shows the trough 30 tilted forwardly to a position at which the rear wall 32 is inclined at tilt angle 38.

Figure 8:
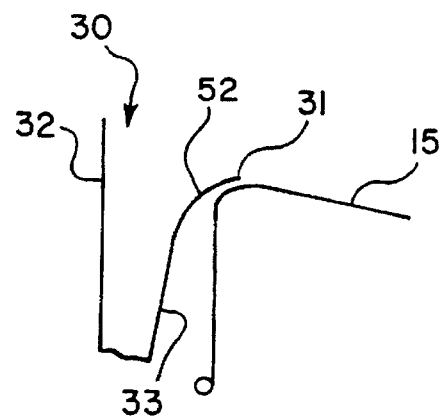
FIG. 8 is a diagram showing the orientation and configuration of an embodiment of the trough lip and the paper/plastic film in accordance with the present invention.

The front lip 31, 131 of the trough 30, 130 as shown in FIGS. 6 and 8 is preferably relatively short and is of a curved shape. The convex-up shape of the lip 31, 131 provides a smooth, at least substantially continuous transition from the inner surface 52, 152 of the front wall 33, 133 to the point where the foaming ingredients depart the lip 30, 130 at a plurality of tilt angles 38. The horizontal support frame 34 and hence the trough 30, 130 can be positionally adjusted up and down to adjust the positioning of the lip 31, 131 relative to the fall plates 10 or an inclined conveyor. Vertical adjustment of the frame 34 may be achieved by one or more electrically operated jacks 49, or other lifting means such as hydraulic pistons. Preferably, two jacks 49, one on each side of the trough 30, 130 are utilized for vertical adjustment of the frame 34 of trough 30, 130.

In embodiments of the invention, the horizontal support plate 34 and trough 30, 130 may also be adjusted horizontally to horizontally position the lip 31, 131 closer to or further from the film 15 and fall plates 10.

Figure 10:
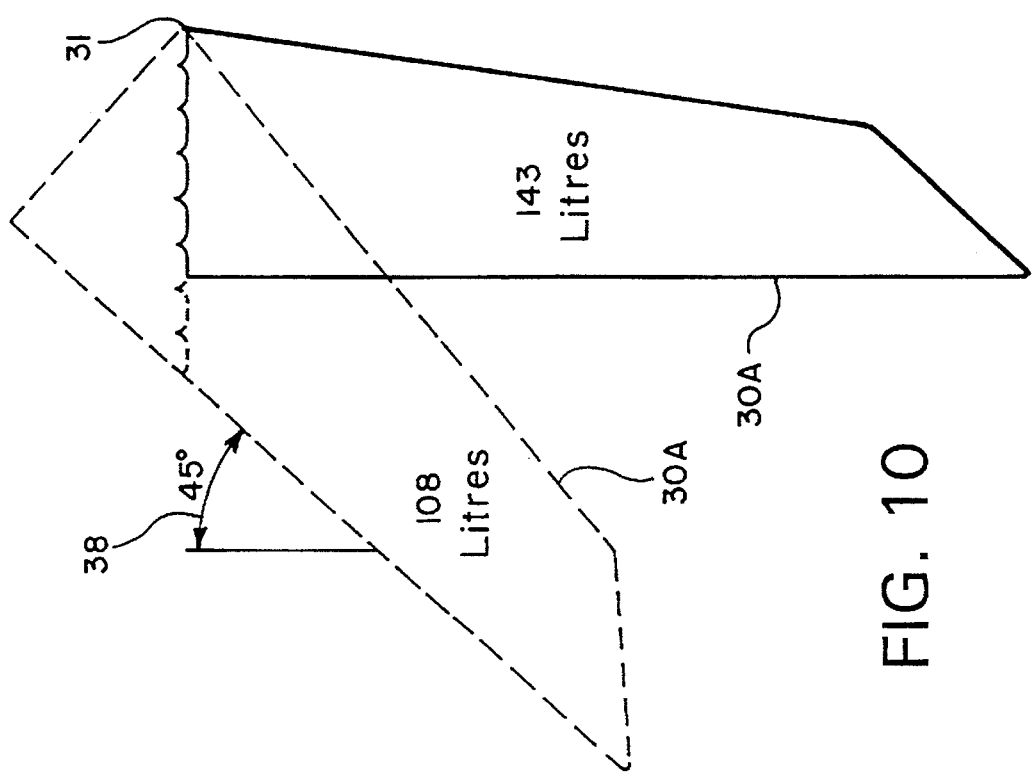
FIG. 10 is a sectional view showing the change in volume between tilted and untilted positions of an embodiment of the trough in accordance with the present invention.
Figure 9:
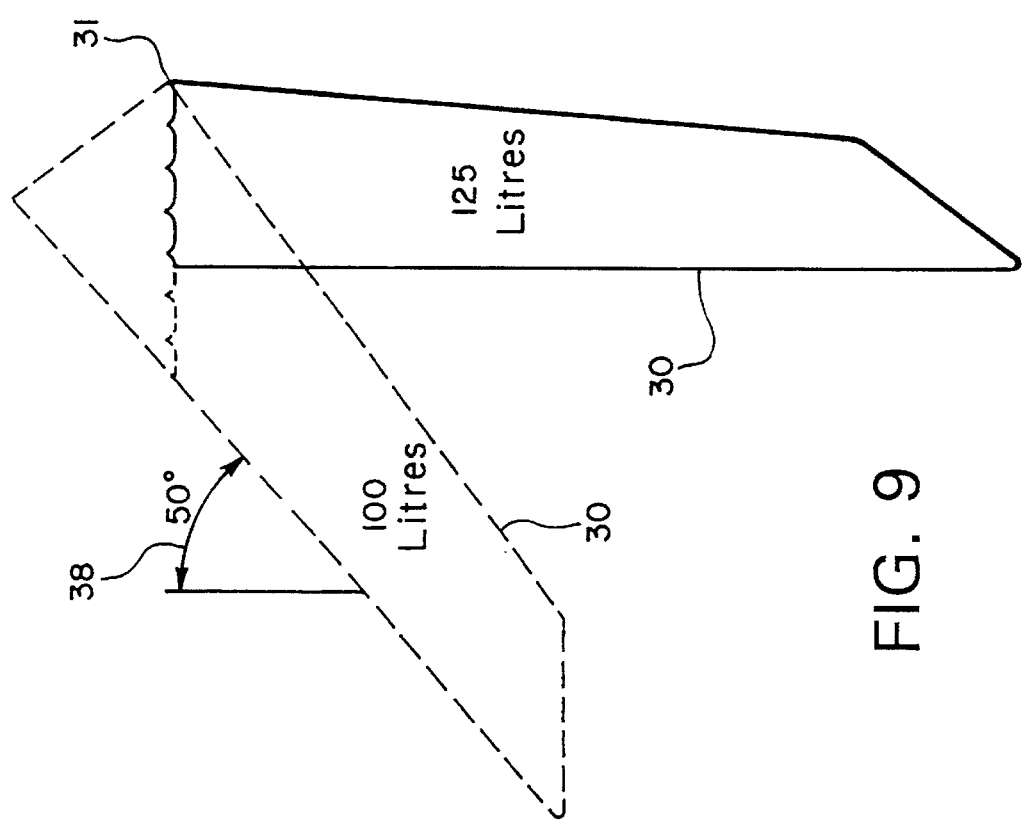
FIG. 9 is a sectional view showing the change in volume between tilted and untilted positions of an embodiment of the trough in accordance with the present invention.

As the trough 30, 130 is tilted from the vertical to the inclined position, the utilizable volume, i.e., the volume of mixed ingredients which can be accommodated inside the trough 30, 130 before flowing over the lip 31, 131 is reduced. It can be appreciated from FIGS. 9 & 10, that various trough angles 38 can be selected during the pouring of numerous grades of foam to optimize the dwell time of the chemicals in the trough and hence the viscosity of the exiting foam-froth without recourse to catalyst changes. By way of example, FIG. 9 shows that a typical trough 30 of approximately 125 liters capacity in the vertical position will have a utilizable volume of approximately 100 liters when tilted through a tilt angle 38 of 50°, a volume reduction of about 20%. Also, FIG. 10 shows that a typical trough 30A having the same width but a larger capacity of approximately 143 liters in the vertical position will have a utilizable volume of approximately 108 liters when tilted through a tilt angle 38 of 45°, a volume reduction of about 25%.

Exemplary dwell times for the components in the trough may range from about 15 seconds to about 45 seconds before they overflow and pass over the trough lip 30 for application to the film surface 15.

As the trough is tilted, the forward edge of lip 31, 131 moves downwardly towards the surface of the film 15 running over the fall plate 10. If a conventional trough lip 9 having a conventional sharply angled trough lip configuration were tilted, this would cause the lip 9 to snag the film 15. It would also impede the smooth flow of frothing foam chemicals by virtue of their having to traverse the upturned, sharply angled trough lip 9 at the juncture 14 or vertex of the lip 9 and inner surface of front wall 13 shown in FIG. 7.

With the foreshortened lip 31, 131 of the invention as shown in FIGS. 3, 4, 6, and 8, tilting of the trough and the associated movement of the lip 31, 131 is possible without snagging of the film 15. The trough lip 31, 131 of the invention is far less pronounced than the conventional trough lip 9 shown in FIGS. 1, 2, and 7. Trough lip 31, 131 of the present invention enables large angle changes of tilt angle 38 to be made without major deflection of the trough lip 31, 131 that could force the forward edge of lip 31, 131 onto the paper or plastic conveyor film, thus tearing it.

As the trough tilt angle 38 is varied, the position and orientation of trough lip 31, 131 changes. This may result in a change in the distance from the lip 31, 131 to the fall plate 10 and film 15. The jacks 49 allow vertical adjustment movement of the frame 34 so that a desired small clearance between the lip 31, 131 and the fall plate 10 and the paper or plastic film 15 thereon can be maintained in all angular positions of the trough 30, 130. This small clearance or predetermined gap between the lip 31, 131 and the fall plate 10 may, for example, be from about 0.125 inch to about 2 inches. The predetermined gap and inclination between the curved lip 31, 131 and the surface or film 15 upon which the foamed froth is allowed to further react may also be maintained or adjusted by adjustment of the height of the film 15 and fall plates 10. In embodiments of the invention, as shown in FIG. 6 the end or edge 160 of the lip 131 may curve downwardly and back towards the outer surface of the front wall 133 to further assure against snagging of the film and to reduce the need for vertical and horizontal adjustment of the frame 34.

Figure 7:
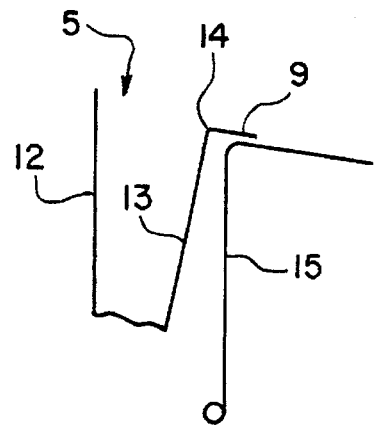
FIG. 7 is a diagram showing the orientation and configuration of the trough lip and the paper/plastic film in a prior process.

Also, when the upturned, sharply angled conventional trough lip 9 shown in FIGS. 1, 2, and 7 is replaced with the shorter, radiused lip 31, 131 of the invention, there is a resultant reduction in shear forces on the froth as it moves from the trough 30, 130 to the film 15 and fall plate 10. These shear forces may be caused by: (1) an abrupt re-direction of the foam froth in zone 8 as it exits the trough 5, (2) surface drag of the froth on the surface of the static trough lip 9 relative to the froth above it, and (3) the abrupt change in speed of the froth when moving from the stationary trough lip 9 to the moving film 15 which is typically traveling at a rate of 14 to 21 feet per minute. This shear force reduction gives rise to a large reduction in the number of small holes usually present toward the base of the foam blocks. It is believed that this reduction in shear forces results in less stretching and "tearing" of the fragile froth which provides for a dramatic reduction in the number of holes occurring at and/or near the base of the foam blocks.

The polyols which are employed in the present process may be any of those known to be suitable for use in preparing conventional polyurethane foams, and such polyols are well known to those skilled in the art. They are often prepared by the catalytic condensation of an alkylene oxide or mixture of alkylene oxides either simultaneously or sequentially with an organic compound having at least two active hydrogen atoms, such as those described in U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids, of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable mines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenedimine, 1,3-diaminopropane, 1,3-diaminobutane, 1,4-diaminobutane, and ammonia.

Also, polyols containing ester groups can be employed in the process. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, or (3) by low temperature polymerization in the presence of chain transfer agents.

In embodiments of the invention, polyether polyols, including those having an average molecular weight in the range of from about 200, preferably from about 1000 to about 10000, may be used. In other embodiments of the invention, the polyol is a polymer-modified polyol. By polymer-modified polyol is meant a polyol carrier containing additional polymeric material which can act as a polymeric flier influencing cell structure in the finished polyurethane foam. The polymeric material may be a physical dispersion or solution in the polyol and/or may be chemically combined therewith. Preferably it is a dispersion. Suitable polymer-modified polyols are described in U.K. Patent 1,501,172 and U.S. Pat. No. 4,374,209. Thus, the polymer-modified polyol may be either a dispersion of a polyurea and/or polyhydrazodicarbonamide in a relatively high molecular weight organic compound containing at least two hydroxyl groups or a dispersion of the polyaddition products resulting from reacting an alkanolamine with an organic polyisocyanate in the presence of a polyol containing at least two hydroxyl groups. In either case, the percentage of polyurea/polyhydrazodicarbonamide or polyaddition products in the polymer-modified polyol preferably constitutes 1% to 35% by weight based on the polyol.

For example, the polymer-modified polyol may comprise a dispersion of a polymeric substance in a carrier polyol, the polymeric substance being a polyaddition product of an alkanolamine and an isocyanate. Polyols of this type, which are known commercially by the tradename PIPA, are described and claimed in U.S. Pat. No. 4,374,209 to Rowlands. As described in U.S. Pat. No. 4,374,209 a suitable polymer-modified polyol can be obtained by reacting an alkanolamine, particularly triethanolamine, with an organic polyisocyanate in the presence of the aforesaid carrier polyol so that the alkanolamine reacts at least predominantly polyfunctionally with the isocyanate and the polyol acts at least predominantly as an unreacted carrier. The molar ratio of the alkanolamine to the isocyanate may be in the range 1.0/0.5 to 1.0/1.6, particularly 1/0.8 to 1/1.1, although ratios in excess of 1/1.6 may also be possible particularly in the presence of a chain capping agent.

A polymer-modified polyol in which the disperse phase comprises the reaction product of an isocyanate with at least one polyamine and/or hydrazine and/or hydrazide (these being known as "PHD" polyols) may also be used in the present process and apparatus. A polymer-modified polyol of the kind described in U.K. Patent 1,501,172 can be obtained by reacting isocyanate with polyamines containing primary and/or secondary amino groups and/or hydrazines and/or hydrazides in the presence of a polyether polyol having predominantly primary hydroxyl groups. A polymer-modified polyol of this kind is commercially available as Multranol 9225 (Mobay Chemical Corporation).

Another kind of polymer-modified polyol which is described in U.S. Pat. No. 4,374,209 and U.K. Patent Nos.

1,482,213 and 1,501,172 which may be used is a polyol having dispersed therein and/or chemically combined therewith a polymeric material derived from the in-situ polymerization of an ethylenically unsaturated monomer such as a grafted polyether obtained by polymerization of acrylonitrile and styrene in a polyether polyol. Thus, the polymer-modified polyol used in the process and apparatus of the present invention may be one in which the disperse phase is a styrene/acrylonitrile graft polymer.

The polyol carrier may be any suitable substance including polyether polyols having a molecular weight in the range 200 to 10,000 such as are known for use in the polyurethane-forming reaction and described for example in U.K. Patent 1,482,213 and as referred to in the above-mentioned U.K. Patent 1,501,172 and U.S. Pat. No. 4,374,209. Such known polyether polyols can be obtained by reaction of alkylene oxides with active hydrogen containing compounds, the molecular weight of the reaction product depending on the amount of alkylene oxide reacted. Typically, the polyether polyol may have a hydroxyl number in the range 20 to 80 and from two to four hydroxyl groups per molecule. Most preferably the polyol has a high primary hydroxyl content, particularly at least 50% primary hydroxyl. Suitable polyols are readily commercially available, for example Dow Chemicals Voranol 4301.

The isocyanate used in the present process may be any isocyanate effective in producing polyurethanes. Thus, organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenyl-methane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2',5,5'-tetraisocyanate and polymeric polyisocyanates such as polymethylene polyphenylene polyisocyanate. Especially useful due to its availability and properties is toluene diisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethanediamine. These crude isocyanates are disclosed in U.S. Pat. No. 3,215,652.

Exemplary mounts of water which may be present may range from about 1 to about 6 parts by weight per 100 parts by weight of polyol.

Auxiliary blowing agents which may be used include an organic blowing agent in a proportion of 0 to 20 parts by weight, such as a halogenated hydrocarbon having a boiling point less than 100° C. at atmospheric pressure (preferably less than 50° C.), for example trichlorofluoromethane or dichlorodifluoromethane or methylene chloride or mixtures thereof. In embodiments of the invention, acetone may be used as an auxiliary blowing agent as described in my U.S. Pat. No. 5,120,771, the disclosure of which is incorporated herein by reference in its entirety.

The catalyst used in the present process desirably comprises a first catalyst material for catalyzing the reaction of the polyol and the isocyanate to form the polyurethane polymer, and a second catalyst material for catalyzing the reaction of the isocyanate with the water to generate gas and thus produce blowing of the foam. Desirably, the first catalyst material comprises an organotin compound and the second catalyst material comprises an amine. Examples of appropriate organotin compounds include stannous octoate, stannous chloride, dibutyltin di-2-ethyl hexanoate, and stannous oxide. Examples of appropriate amines are triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropylpropylenediamine, 3-diethylaminopropyldiethylamine and dimethylbenzylamine.

The catalysts may be employed in conventional catalytic amounts used for the production of polyurethane foams.

It is desirable that the mixture include a surface-active agent to produce a foam containing small cells of fairly uniform size. The preferred surface-active agent for this purpose is a silicone surfactant. Various commercially-available silicone surfactants suitable for use in producing polyurethane foams are well known to those skilled in the art and may be used in the present invention. For example, the formulation may include a foam stabilizing surfactant which is a polysiloxane-polyalkylene oxide block copolymer (e.g. a water-soluble polydimethyl siloxane polyalkylene oxide copolymer as described in U.S. Pat. No. 3,629,308) which is of the low molecular weight kind as is conventionally used in the production of high resilience flexible foams from high activity polyol starting materials, as is typified by Dow Corning Silicone 5043. The surfactant may be incorporated in any suitable proportion, for example from about 0.5 to about 3 parts by weight (per 100 parts polyol).

As is well-known to those skilled in the art of polyurethane manufacture, a variety of additives may be included in the foam-forming mixture to control various properties of the reaction mixture and/or the resultant foam. Exemplary additives which may be used include cross-linking or chain lengthening agents (e.g. diethanolamine, triethanolamine, ethylene glycol and other commonly used agents), fillers, foam stabilizers, and the like.

The foam-forming mixture may include one or more flame-retardants as an additive to improve the flame resistance of the resultant foam. A preferred flame-retardant for use in the present invention is melamine, either alone or in combination with at least one other flame-retardant, which is desirably a halo-substituted phosphate ester flame-retardant. The use of melamine with a polymer-modified polyol in the production of high-resilience flexible polyurethane foams is described in my U.S. Pat. No. 5,506,278 and my U.S. application Ser. No. 08/357,346, filed Dec. 15, 1994. As disclosed therein, the amount of melamine may range from 1 to 150 parts by weight, preferably from 50 to 150 parts by weight, based on the weight of the polymer-modified polyol. The entire disclosures of my U.S. Pat. No. 5,506,278 and U.S. application Ser. No. 08/357,346 are herein incorporated by reference.

What is claimed is:

1. A process for the continuous production of a polyurethane foam comprising:

mixing foam forming chemicals, said mixing being effected to produce an unfoamed liquid mixture;

feeding said unfoamed liquid mixture into an open-topped trough in which said liquid mixture remains for a dwell time during which an exothermic and gas-forming reaction occurs and the liquid begins to foam and form a partially foamed froth;

adjusting the dwell time and the volume of the open-topped trough by tilting said trough to a tilt angle so that the utilizable volume of the trough is less than its maximum capacity; and continuously discharging said partially foamed froth from said trough at said tilt angle while continuously feeding said unfoamed liquid mixture into said trough, said partially foamed froth being discharged across a curved lip at the top of the open-topped trough on to a surface on which the foamed froth is allowed to further react and form a solid polyurethane foam material.

2. A process as claimed in claim 1 wherein the curved lip is shaped to minimize shear forces and stresses in the foam and ensure smooth overflow of the foamed froth at different tilt angles.

3. A process as claimed in claim 1 wherein, for different tilt angles, a predetermined gap and inclination are maintained between the curved lip and the surface on which the foamed froth is allowed to further react.

4. A process as claimed in claim 1 wherein the tilt angle is from about 5° to about 60°.

5. A process as claimed in claim 3 wherein said predetermined gap is from about 0.125 inches to about 2 inches.

6. A process as claimed in claim 3 wherein said predetermined gap and inclination is maintained by adjusting the height of the open-topped trough.

7. A process as claimed in claim 3 wherein said predetermined gap and inclination is maintained by adjusting the height of the surface on which the foamed froth is allowed to further react.

8. A process as claimed in claim 1 wherein the tilt angle is changed in increments of 1° or less.

9. A process as claimed in claim 1 wherein said open-topped trough has an inclined front wall and said tilting is effected by applying a force to said inclined front wall.

10. A process for the continuous production of a polyurethane foam comprising:

mixing foam forming chemicals, said mixing being effected to produce an unfoamed liquid mixture;

feeding said unfoamed liquid mixture into an open-topped trough in which said liquid mixture remains for a dwell time during which an exothermic and gas-forming reaction occurs and the liquid begins to foam and form a partially foamed froth;

adjusting the dwell time and the volume of the open-topped trough by tilting said trough to a tilt angle, said tilt angle being such that partially foamed froth formed in the trough overflows the trough but said unfoamed liquid mixture does not overflow the trough; and allowing said partially foamed froth to continuously overflow said trough at said tilt angle across a curved lip at the top of the open-topped trough on to a surface on which the foamed froth is allowed to further react and form a solid polyurethane foam material.

11. A process as claimed in claim 10 wherein the trough is tilted by pivoting said trough relative to a support frame for said trough and the foaming ingredients are transferred to a continuous conveyor belt.

* * * * *